Oct. 14, 1924.  
A. E. DRISSNER  
1,511,804  
LOCKING MECHANISM FOR CYLINDERS OR THE LIKE  
Filed May 1, 1923

Inventor  
Alfred E. Drissner  
by his Attorneys,  
Weed & Gray

Patented Oct. 14, 1924.

1,511,804

UNITED STATES PATENT OFFICE.

ALFRED E. DRISSNER, OF CLEVELAND, OHIO, ASSIGNOR TO THE NATIONAL ACME COMPANY, OF CLEVELAND, OHIO, A CORPORATION OF OHIO.

LOCKING MECHANISM FOR CYLINDERS OR THE LIKE.

Application filed May 1, 1923. Serial No. 636,025.

*To all whom it may concern:*

Be it known that I, ALFRED E. DRISSNER, a citizen of the United States, residing at Cleveland, in the county of Cuyahoga and State of Ohio, have invented certain new and useful Improvements in Locking Mechanism for Cylinders or the like, of which the following is a specification.

This invention relates to locking mechanism for cylinders or spindle carriers, particularly adapted and designed for use in machines wherein the indexing of the cylinder, spindle carrier, or turret is required, an object of the invention being to provide an improved locking mechanism of this character which will be more efficient and durable in use and positive in operation, and not dependent as heretofore upon springs for controlling any of the parts of the locking mechanism.

A further object of this invention is to provide a locking mechanism for cylinders or the like controlled in an improved manner by means of camming mechanism so that the cylinder is positively secured in position, the construction and operation of the locking means being such that the vibration or shocks incident to the stopping or locking of the cylinder is diminished to a considerable extent.

A further object of this invention is to provide an improved positive cam operated locking mechanism for cylinders, spindle carriers or the like, which will more effectively and efficiently lock and unlock the cylinder during operation. Heretofore in locking mechanisms of this character the lock bolt has had a tendency to vibrate when the tools are at work thus impairing the accuracy in operation of the tools upon the work, but as a result of the present improvement this tendency of the lock bolt to vibrate is eliminated.

A further object of this invention is to provide an improved locking mechanism for cylinders or the like which will so operate to stop the rotation of the cylinder with a minimum of vibration, shock and noise, and also so operate to positively lock and unlock the cylinder as to considerably improve the operation of the machine. The present mechanism comprises preferably camming means for shifting the lock bolt of the locking mechanism into partial locking position in the cylinder, camming means subsequently operated to shift the lock bolt into full locking position, and camming means operative at a predetermined time for positively withdrawing the lock bolt, this last camming means cooperating with the first camming means when the bolt is shifted into partial locking position.

Figure 1:
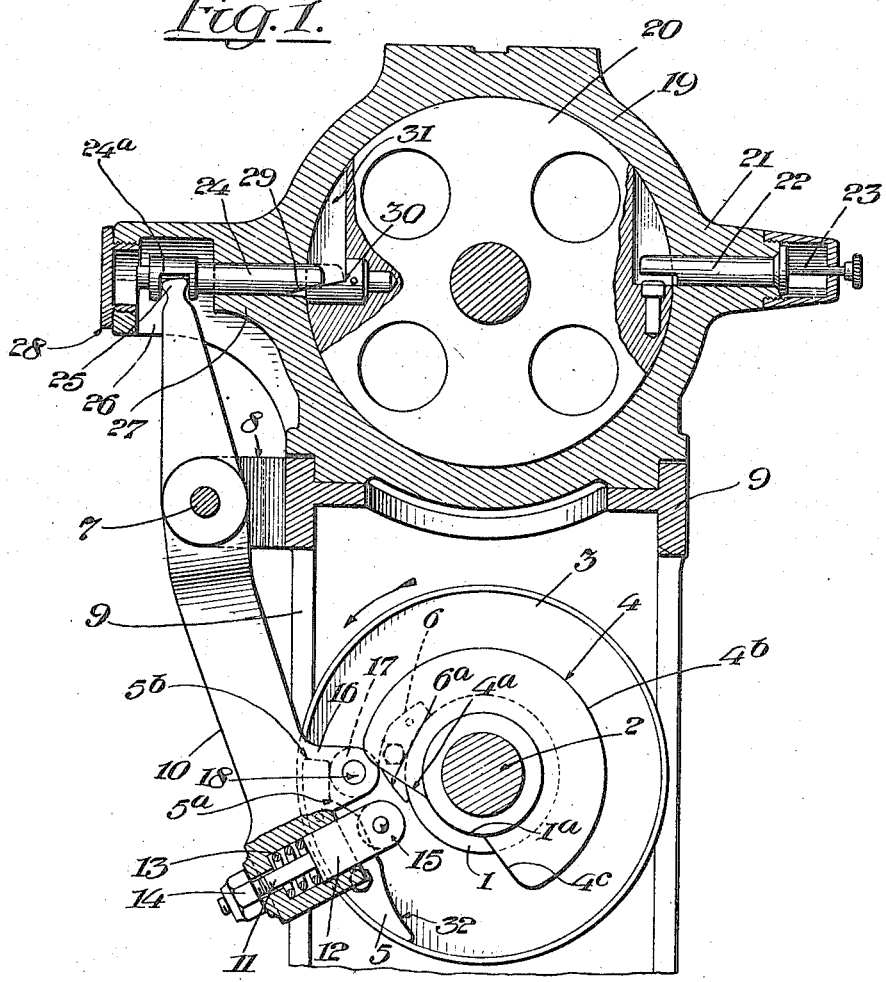
Figure 2:
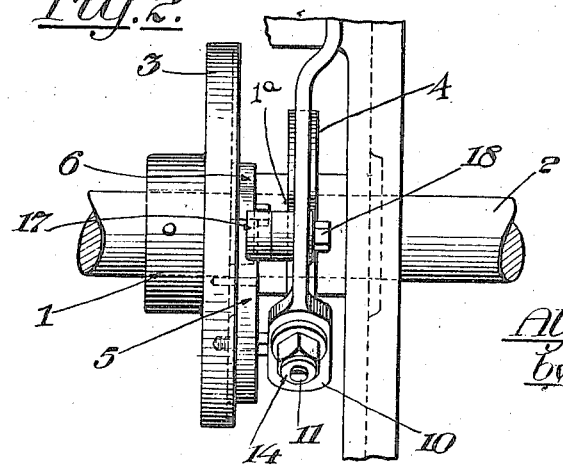

Other objects of this invention will appear in the following description and appended claims thereof, reference being had to the accompanying drawing forming a part of this specification wherein like reference characters indicate corresponding parts in the several views and wherein Fig. 1 is a cross sectional elevation illustrating the improved mechanism as applied to an automatic multiple spindle machine; and Fig. 2 is a detail side elevation broken away illustrating the improved construction.

Before explaining in detail the present improvement and mode of operation thereof, it is desired to have it understood that the invention is not limited to the details of construction and arrangement of parts which are illustrated in the accompanying drawings, since the invention is capable of other embodiments, and that the phraseology which is employed is for the purpose of description and not of limitation.

The present improved locking mechanism is preferably adapted to be used in connection with metal working machines, such as multiple spindle automatic lathes, plain turret lathes, or other machines manufactured by The National Acme Company, and the particular locking mechanism herein shown and described in its preferred form is an improvement in part over Patent 1,320,609 for automatic multiple spindle screw machines, and also an improvement in part over my copending application Serial No. 525,300, filed December 28, 1921.

In the drawings it will be seen that the cam disc or drum 1 is mounted and secured in any suitable manner upon a cam shaft 2, the latter being revolubly mounted in suitable bearings in the bed or frame of the machine. The cam disc or drum 1 is provided with an annular flange member 3, and the disc or drum 1 is suitably machined at 1ᵃ so as permit a cam 4 to be locked and bolted thereon. Secured to the flange member 3 adjacent to the outer edge thereof is a cam 5 and also secured to the flange 3 is a cam 6 which is spaced inwardly from the cam 5 and located in predetermined position adjacent thereto.

Pivotally mounted as at 7 on a bracket 8 rigidly secured to the bed 9 of the machine is a lock bolt lever 10. This lever at its lower end is drilled to receive a reduced end or stem 11 of a roller support 12, and is also counterbored to receive the enlarged end of the support 12, the latter forming a shoulder between which and the counterbore is located a spring 13 which acts as a cushioning means as well as a safety device for the locking mechanism. The reduced end or stem 11 of the roller support projects through the locking lever 10 and is threaded at its outer end for the reception of a nut 14. The inner end of the roller support 12 is machined to receive a roller 15 suitably journalled therein. the roller being adapted to be acted upon by the cam 4 at predetermined times. It will be noted that the nut 14 may be adjusted so as to adjust the position of the roller 15 and the tension of the spring 13.

Adjacent to the roller 15 the lock lever 10 is provided with an abutment 16 which is suitably machined so as to receive cam roller 17 held in position as by means of a pivot screw 18. This roller 17 it will be noted is in position to be acted upon by the cams 5 and 6 at predetermined times.

Mounted upon the bed frame 9 is casing 19 which forms a housing for indexing carrier or work spindle carrier 20, the casing at one side being provided with an extended bearing 21 in which is housed a beveled latch or adjusting bolt 22. This latch or bolt is preferably controlled by means of a screw 23 and a spring (not shown) mounted interiorly of the bolt 22, the construction of the latch bolt being substantially similar to that illustrated in my copending application hereinbefore mentioned and therefore a further description thereof is not deemed necessary herein.

The cylinder casing at its opposite side is bored to receive a lock bolt 24, the lock bolt at 24$^a$ being crotched so as to receive the rounded end 25 of the lock bolt lever 10 which, as will be seen, extends into a recess 26 formed in an extended bearing 27 of the casing. This extended bearing at its outer end is tapped to receive a threaded cap 28 which is screwed into the end of the bearing and may be removed for the purpose of removing the lock bolt 24. The lock bolt 24 at its inner end is machined so as to provide preferably a tapered face 29 adapted to cooperate with the tapered face of a lock bolt seat 30. The cylinder is preferably provided with a plurality of lock bolt seats 30 located in stations 31 machined in the outer face of the cylinder, one being shown herein by way of example.

In the operation of this improved locking mechanism when the cylinder 20 is ready to be indexed, the cam surface 32 of the cam 5, which revolves with the cam disc 1 and the cam shaft 2, coacts with the roller 17 and draws the lower end of the lock bolt lever 10 toward the cam shaft and at the same time forces the lock bolt 24 away from the cylinder out of the tapered seat 30. Thereupon the cylinder is indexed to bring the next station thereof into position with relation to the lock bolt 24, the latch bolt 22 being forced out of its station upon the revolution of the cylinder and riding on the periphery of the cylinder until the indexing is completed.

The cam 5 operates to hold the lock bolt 24 withdrawn until the cylinder is approximately two-thirds indexed. As the cam disc 1 revolves the cam 6 approaches the roller 17. The working face 6$^a$ of the cam 6 is so machined as to force the roller 17 to travel down over a tapered face or step 5$^a$ of the cam 5 whereupon the lower end of the lock lever 10 is forced outwardly causing the lock bolt 24 to be forced into partial locking position as shown in full lines in Fig. 1. By the time the lock bolt is in this position the cylinder is fully indexed and because of its inertia would continue to turn except for the fact that the lock bolt acts as a stop, the tapered seat 30 striking the lock bolt and stopping the motion of the cylinder.

Immediately after the cylinder is stopped the roller 17 travels off the end 5$^b$ of the cam 5, and at this point the face 4$^a$ of the cam 4 engages the roller 15 and operates to force the lock bolt 24 positively and securely into full locking position in its seat 30 as shown in dotted lines in Fig. 1. It will be noted that the continuous cam surface 4$^b$ of the cam 4 operates to maintain the lock bolt in its full locking position during the entire time that the tools are operating upon the work in the cylinder and hence the lock bolt is rigidly held in position and all tendency to vibrate is eliminated. When the cylinder is ready to index again the cam 4 at 4$^c$ rides off the roller 15 and permits the same to be free.

It will be noted that the spring 13 operates not only as a cushioning means for the locking mechanism but also as a safety device to permit the accommodation or adjustment of the lock bolt to any variation in the lock bolt seats or to take care of any variation that might occur in the cam 4 or the lock bolt lever itself, or in any other manner to prevent any tendency of the parts to break under undue strain.

It will be seen therefore that the lock bolt 24 is forced into the seat 30 by successive steps through successively operating cams 6 and 4 so as to positively lock the cylinder and at the same time positively absorb the rebound or vibration thereof when the lock bolt seat 30 strikes the lock bolt 24, this being aided by virtue of the wedging action of the cooperating tapered faces of the lock bolt and seat. In other words when the locking seat 30 strikes the lock bolt 24 any rebound or vibration of the cylinder will be absorbed when the cam 4 forces the lock bolt into full locking position, the wedge or tapered faces of the lock bolt and locking seat absorbing the rebound. It will also be noted that the present mechanism does not depend upon springs to force the lock bolt into its initial or partial locking position, this being accomplished positively by means of the cam 6 cooperatng with the cam 5 to force the roller 17 down over the step 5ª of the cam 5. Thus the cam 5 first operates to unlock the lock bolt 24 and then cooperates with the cam 6 to force the lock bolt into partial locking position, whereupon the cam 4 is effective to force the lock bolt into full locking position.

It is to be understood that by describing in detail herein any particular form, structure, or arrangement, it is not intended to limit the invention beyond the terms of the several claims or the requirements of the prior art.

Having thus explained the nature of my invention and described a way of constructing and using the same, although without attempting to set forth all of the forms in which it may be made or all of the modes of its use, I claim:

1. Locking mechanism for cylinders or the like comprising the combination of a lock member adapted to cooperate with the cylinder, means for shifting said member out of locking position to permit the cylinder to be indexed, cam means for shifting said member into partial locking position to stop the rotation of the cylinder, and means for shifting said member into position to absorb the vibration or recoil of the cylinder.

2. Locking mechanism for cylinders or the like comprising the combination of a lock member adapted to cooperate with the cylinder, means for shifting said member out of locking position to permit the cylinder to be indexed, cam means for shifting said member into partial locking position to stop the rotation of the cylinder, and cam means for shifting said member into position to absorb the vibration or rebound of the cylinder.

3. Locking mechanism for cylinders or the like comprising the combination of a lock member adapted to cooperate with the cylinder, cam means for shifting said member out of locking position to permit the cylinder to be indexed, cam means for shifting said member into partial locking position to stop the rotation of the cylinder, and cam means for shifting said member into position to absorb the vibration or rebound of the cylinder.

4. The combination of an indexing member having a plurality of wedge-shaped locking seats, a lock member, means for shifting said lock member out of locking position relatively to a seat to permit the indexing of said indexing member, cam means for shifting said locking member against a seat to stop the rotation of said indexing member, and cam means for shifting said lock member relatively to said seat to take up the vibration or rebound of the indexing member.

5. The combination of an indexing member having a plurality of wedge-shaped locking seats, a lock member, cam means for shifting said lock member out of locking position relatively to a seat to permit the indexing of said indexing member, cam means for shifting said locking member against a seat to stop the rotation of said indexing member, and cam means for shifting said lock member relatively to said seat to take up the vibration or rebound of the indexing member.

6. Locking mechanism for cylinders or the like comprising the combination of a lock member adapted to cooperate with the cylinder, means for shifting said lock member to stop the rotation of the cylinder, and means for shifting said lock member relatively to the cylinder to lock the same in a position of rebound.

7. Locking mechanism for cylinders or the like comprising the combination of a lock member adapted to cooperate with the cylinder, cam means for shifting said lock member to stop the rotation of the cylinder, and means for shifting said lock member relatively to the cylinder to lock the same against vibration.

8. Locking mechanism for cylinders or the like comprising the combination of a lock member adapted to cooperate with the cylinder, means for shifting said lock member to stop the rotation of the cylinder, and cam means for shifting said lock member relatively to the cylinder to lock the same in a position of recoil.

9. Locking mechanism for cylinders or the like comprising the combination of a lock member adapted to cooperate with the cylinder, cam means for shifting said lock member to stop the rotation of the cylinder, and cam means for shifting said lock member relatively to the cylinder to lock the same in a position of rebound.

10. The combination of an indexing member, a lock member adapted to cooperate therewith, and cam mechanism for shifting said lock member successively into one position to stop said indexing member and into another position to lock the indexing member in a position of rebound, said lock member and indexing member having cooperating wedge faces for taking up the rebound or vibration of the indexing member.

11. The combination of an indexing member, a lock member adapted to cooperate therewith, and cam mechanism for shifting said lock member successively into one position to stop said indexing member and into another position to lock the indexing member in a position of rebound, said lock member and indexing member having cooperating means for taking up the recoil or vibration of the cylinder.

12. The combination of an indexing member, a lock member adapted to cooperate therewith, a cam for shifting said lock member into position to stop said indexing member, a cam for shifting said lock member into position to lock said indexing member in a position of rebound, said members having cooperating means for taking up the rebound or vibration of the indexing member, and means for cushioning one of said cams.

13. Locking mechanism for cylinders or the like comprising the combination of a lock member, an operating member for said lock member, a cam acting on said operating member for shifting said lock member into position to stop the cylinder, and a cam acting on said operating member for shifting the lock member to lock the cylinder in a position of rebound.

14. The combination of an indexing cylinder, a lock member, an operating member for said lock member, a cam acting on said operating member for shifting the lock member into position to stop the cylinder, and a cam acting on said operating member for further shifting the lock member relatively to the cylinder, said lock member and cylinder having cooperating means effective to shift the cylinder into fixed position.

15. The combination of an indexing cylinder, a lock member, an operating member for said lock member, a cam acting on said operating member for shifting the lock member into position to stop the cylinder, a cushioned cam acting on said operating member for shifting the lock member to lock the cylinder in partially retracted position, said lock member and cylinder having wedge faces cooperating to effect the partial retraction of the cylinder.

16. The combination of an indexing member, a lock member, and means for shifting said lock member into locking position relative to said indexing member, said members cooperating to effect a partial retraction of said indexing member when locked in position.

17. The combination of an indexing member, a lock member, and cam means for shifting said locking member into locking position relative to said indexing member, said members cooperating to effect a partial retraction of said indexing member when locked in position.

18. The combination of an indexing member having a locking seat, a lock member, said lock member and seat having cooperating wedge faces, means for shifting said lock member against said seat to stop the rotation of said indexing member, and means for further shifting said lock member to cause said wedge faces to effect a partial retraction of the indexing member and lock the same in a position of rest.

19. The combination of an indexing cylinder, a lock bolt cooperating therewith, an operating member for said lock bolt, cam means acting upon said operating member for shifting said bolt into position to stop the cylinder, and means acting upon said operating member for further shifting said bolt into position to lock the cylinder, said cylinder and bolt having cooperating means effective upon movement of the bolt into locking position to partially retract the cylinder.

20. The combination of an indexing cylinder, a lock member, a pair of cooperating cam means for shifting said lock member into partial locking position to stop the cylinder, and cam means operative to shift said lock member into full locking position, said lock member and cylinder having cooperating means effective upon movement of the lock member into full locking position to partially retract the cylinder.

21. The combination of an indexing cylinder, a lock member, a pair of cooperating cam means for shifting said lock member into partial locking position to stop the cylinder, and cam means operative to shift said lock member into full locking position, said lock member and cylinder having cooperating wedge means effective upon movement of the lock member into full locking position to partially retract the cylinder.

22. In a metal working machine. the combination of an indexing cylinder, a lock member adapted to cooperate therewith, an operating member for said lock member, a cam shaft, a pair of cam rolls carried by said operating member, means for cushioning one of said cam rolls, a cam carried by said cam shaft and acting upon one of said cam rolls for shifting said lock member into partial locking position relative to the cylinder, a cam carried by said cam shaft and coacting with a cam roll for shifting said lock member into full locking position, and a cam carried by said cam shaft and acting upon a cam roll for shifting said lock member out of locking position, said lock member and cylinder having cooperating means effective when the lock member is shifted into full locking position to partially retract the cylinder and absorb the rebound thereof.

Signed at Cleveland, Ohio, this 27th day of April, 1923.

ALFRED E. DRISSNER.